(12) United States Patent  (10) Patent No.: US 8,302,592 B2
Phelps  (45) Date of Patent: Nov. 6, 2012

(54) DUAL IGNITION SAFE CHARCOAL STARTER

(76) Inventor: Kathy Elizabeth Phelps, Lilburn, GA (US)

( * ) Notice: Subject to any disclaimer, the term of this patent is extended or adjusted under 35 U.S.C. 154(b) by 341 days.

(21) Appl. No.: 12/455,729

(22) Filed: Jun. 5, 2009

(65) Prior Publication Data
US 2010/0307475 A1 Dec. 9, 2010

(51) Int. Cl.
F23Q 13/00 (2006.01)
(52) U.S. Cl. ....... 126/25 B; 126/26; 126/25 R; 126/144; 219/260
(58) Field of Classification Search ................ 126/25 B, 126/26, 25 R, 144, 152; 219/260
See application file for complete search history.

(56) References Cited

U.S. PATENT DOCUMENTS 3,339,505 A * 9/1967 Bean .......................... 126/25 B
5,638,807 A * 6/1997 Flamenbaum .............. 126/25 B

* cited by examiner

Primary Examiner — Alfred Basichas

(57) ABSTRACT

The improved charcoal starter design has several improvements, one being that it utilizes either; readily combustible materials like wadded up paper or a removable or replaceable common electric heating element to heat charcoal to incandescent and safely deposit hot embers into the grill. The common electric heating element is held in place through a clip fixedly attached to the inside of the charcoal starter housing walls and opposite of the opening for the electric heating element. Yet another improvement to this unique charcoal starter designed is the perforated grate having at least one hinge on one side and at least one notch on the opposite side, a release mechanism consisting of a thermally insulated release handle and a release bar with at least one protrusion such that when the release mechanism is activated by pulling the release handle, the protrusion of the release bar aligns with the notch of the perforated hinged grate and the perforated hinged grate will then rotate about the hinge in a downward direction creating an opening and thus allowing the incandescent embers to be deposited safely into the grill where needed and without danger of hot embers and ash being splashed about and possibly injuring the user.

10 Claims, 10 Drawing Sheets

DUAL IGNITION SAFE CHARCOAL STARTER

BACKGROUND OF THE INVENTION

1. Field of Invention

This invention generally relates to charcoal starters having a housing which provides an upper chamber to contain the charcoal, a lower chamber to provide a space for a charcoal igniter such as wadded up newspaper, a grate to separate the upper and lower chambers and to hold the charcoal in position. They also typically provide a plurality of ventilation holes that allow air to pass through the housing and up through the grate plus a handle for dispensing and portability. This type of charcoal starter is preferred over the charcoal lighter fluid method, which is a slow process and can leave a petroleum taste in the food cooked later.

2. Description of Prior Art

Charcoal starters or chimneys are well known and readily available in a variety of shapes and sizes, all having the same intent to deliver incandescent coals for heating or cooking. The majority of devices require the dangerous method of pouring incandescent coals into a barbeque grill with no protection from the incandescent embers and ash that are splashed about in the bottom of the grill and possibly injuring the user of the device. Yet another problem is that the charcoal starter is typically limited to heating the charcoal to incandescent by means of wadded up paper. The ash left by the paper will float up and rest on the food being grilled, making the food less appealing.

One such device is described in U.S. Pat. No. 5,230,325 to Stanley J. Williams. This excellent invention describes a method to protect the user from the dangerously hot sidewalls of the charcoal starter. Although this invention does provide a certain level of safety to the user, it does not protect the user from the splashing of incandescent embers and ash when they are poured into the grill. It also provides for only one method of igniting the coals without lighter fluid and that is the use of paper or the like in the lower chamber directly beneath the grate.

In another excellent invention as described in U.S. Pat. No. 5,638,807 to Judith Flamenbaum, a method to prevent the splashing of incandescent coals and ash is described by having a fold down or drop down grate. This would allow the incandescent coals and ash to drop out of the bottom of the device and eliminate the need for the pouring of the incandescent coals and ash. However, this method calls for a center post plus its support members and a two piece fold away grate, all of which provide for locations for the incandescent coals and ash to become lodged or stuck. Although this invention does provide for a certain level of safety for the user from splashing incandescent coals and ash, it is also more complex to produce then the present invention and provides for only one method of igniting the coals without lighter fluid and that is the use of paper or the like in the lower chamber directly beneath the grate.

In another excellent invention as described in U.S. Pat. No. 5,197,455 to Ross Tessien in which a method for heating coals in a charcoal starter by use of either; an electric heating element or wadded up paper. However, the method described requires that the grate be a built in electric heating element in a three dimensional shape, more specifically, conical in shape. Although the invention does an excellent job in heating of the coals more rapidly and gives the user two options of heating the coals, one with wadded up paper and the other with an electric heating element, it still requires the dangerous practice of the user pouring the incandescent coals and ash into the bottom of the barbeque grill. The Tessien patent also limits the user to a conical shaped electric heating element which is not readily available in the market and not easily removable. The improved invention described in this patent allows for not only for the use of two methods to create hot embers, wadded up paper and a common electric heating element, it also allows for the use of a hinged grate with a release mechanism to safely deposit the hot embers and ash into the grill.

In another excellent invention as described in U.S. Pat. No. 4,282,854 to Garner B. Byars in which a method heating charcoal to incandescent and using a hinged grate to drop the incandescent charcoals out the bottom of the charcoal starter and into the grill. Although innovative, it too is limited to using combustibles like wadded up paper to start the coals, were as the improved invention described in this patent also allows for the use of wadded up paper and electric charcoal starter. The Byars patent uses a single piece hinged grate; the grate automatically opens, by gravity, when the charcoal starter is lifted. This limits the dispensing of the incandescent coals to the exact location the charcoal starter is set down. The improved invention described in this patent, because the release mechanism locks the hinged grate in place until activated, allows the charcoal starter to be moved from one location to another location for the dispensing of the incandescent coals.

In another excellent invention as described in U.S. Pat. Nos. 4,321,907 and 4,461,270 to Richard A. Sutter in which a hinged grate is described and uses a trigger mechanism to release the hot embers safely into the grill. Although innovative by use of the trigger mechanism, the release of the trigger requires the use of two hands, one hand to hold the charcoal starter and the other hand to release trigger, thus allowing the hinged grate to rotate about the hinge and deposit the hot embers into the grill. However using the second hand to release the trigger mechanism puts the second hand dangerously close to the hot charcoal starter housing. Also, the heat from the hot embers will be transferred down the metal wire frame and cause the trigger to become hot to the touch. The charcoal starter described in this patent allows for a one handed operation and provides for a thermally insulated release handle used to activate the release mechanism, thus making the operation easy and safe to use.

SUMMARY OF INVENTION

The present invention provides a means by which all of the above problems are satisfied. This improved charcoal starter provides a housing with vertical sidewalls making a complete enclosure with an open top and an open bottom, a one piece hinged grate that separates the inside of the housing into an upper chamber, that contains and holds the charcoal, and a lower chamber, for combustibles like wadded up paper, a thermally insulated handle for safety and portability, and a release mechanism attached to the handle, that when activated, releases one side of the single piece grate allowing it to rotate about the hinge which then creates an opening for the incandescent coals and ash to drop safely out the bottom of the device and into the barbeque grill. The housing also provides an opening and retention method of a commonly used charcoal electric heating element for a second method of creating incandescent coals.

An object of the improved charcoal starter is a simple single grate hinged on one side, with a release bar on the other side, which, when activated, by pulling the release handle attached to the release bar, permits the grate to rotate downward about the hinge to an open position and thus allows the incandescent coals and ash to drop safely into the barbeque grill.

In addition, an object of this improved charcoal starter is to provide the user with two methods of heating the charcoal to incandescent. One method is to provide a lower chamber for combustibles, like wadded up paper, to be ignited directly below the grate, which allows the heat of the combustible to rise into the upper chamber through holes in the grate and heats the charcoal to incandescent. A second method for creating incandescent coals is to provide an opening and retention method for a common electric charcoal heating element by which the charcoals rest directly on the electric heating element. The electric heating element is then plugged into an appropriate electrical outlet and the electric heating element provides heat to the charcoal until the charcoal becomes incandescent and ready for use.

Yet another object of the improved charcoal starter is provide a completely enclosed housing comprised of all vertical sidewalls with an open top and an open bottom.

The invention also provides for an upper chamber and lower chamber separated by the single piece hinged grate. The upper chamber is provided to hold the charcoal or like material while heat is being applied until the charcoals become incandescent and ready for use. The lower chamber is provided as one location to provide a heat source to the charcoals. A typical material used as a heat source would be wadded up paper.

The invention also provides for a secondary heat source to cause the charcoals to become incandescent. An opening is provided in the upper chamber, just above the single piece grate, so that a common electric charcoal heating element can be inserted into the housing. Although there are several methods to retain the electric heating element, two methods are shown here, one is a strap to hold the electric heating element in the housing at the handle end and the other, is a clip to keep the tip of the element from flipping up and possibly injuring the user.

The invention also provides a handle for portability. Although the drawings show primarily a vertical handle attached to the sidewalls, one skilled in the art could provide several other options for making the charcoal starter portable. This method was used to provide a one handed operation of lifting the charcoal starter to the desired location and activating the release mechanism and opening the grate for depositing the incandescent coals safely into the grill.

The invention also provides a release mechanism for the single piece hinged grate. As shown in the drawings, the release mechanism consists of a release bar with protrusions connected to a release handle which is attached to the main handle for one handed operation. The single piece grate is notched on the opposite side of the hinges. The release bar has corresponding protrusions, that when aligned with the notches on the grate allows the grate to rotate downward about the hinge to an opened position. The release bar has a spring attached at one end, although one skilled in the art could also put the spring in a different location such as between the release handle and the main handle, to keep the protrusions on the bar out of alignment with the notches on the single piece grate. The alignment comes from pulling back on the release handle, against the spring, which causes the protrusions on the bar to align with the corresponding notches on the grate, which causes the grate to rotate downward about the hinge to an open position, thus allowing the incandescent coals and ash to be safely deposited into the barbeque grill. The system is reset by rotating the charcoal starter upside-down, realigning the bar protrusions with the grate notches and allowing the grate to rotate past the protrusions. By removing pressure to the release handle the spring will pull the protrusions on the release bar out of alignment with the notches on the grate so that when the charcoal starter is rotated to its correct upright position, the protrusions on the release bar hold the grate in place, in a horizontal position, thus creating the upper and lower chambers needed for creating incandescent coals.

It should be noted that the operation of the release mechanism is assisted by the spring, but is not required for the operation of the system. The release mechanism could all be done manually without the spring. The spring was added to make the one handed operation easier.

It should also be noted that the resetting of the single piece hinged grate could be aided by the addition of a spring to the hinge, with a spring force is greater then the weight of the grate so it would rotate back into position when the charcoal starter is empty and eliminating the need to flip the charcoal starter upside down, but a spring force less then the weight of the grate plus a minimal amount of charcoal, so that all of the incandescent embers would be safely deposited into the grill.

BRIEF LIST OF REFERENCE NUMERALS UTILIZED IN THE DRAWINGS

1—Single piece hinged grate
2—Assembly rivets
3—Hinge for single piece grate
4—Charcoal chute
5—Release bar
6—Release bar latch
7—Return spring
8—Spring retaining washer
9—Spring retaining nut
10—Charcoal starter
11—Plastic insulator for the release handle
12—Release handle
13—Main handle assembly
14—Heat shield
15—Electric heating element
16—Latch retaining nut
17—Latch retaining screw
18—Hinge for the release handle
19—Plastic insulator for the main handle
20—Electric heating element retaining strap
21—Strap retaining screw
22—Electric heating element clip
23—Lower chamber ventilation holes
24—Upper chamber ventilation holes
25—Grate ventilation holes
26—Element of the electric heating element
27—Opening for the electric heating element
28—Charcoal starter housing
28A—Upper chamber
28B—Lower chamber
29—Main handle
30—Release mechanism notch in grate

DETAILED DESCRIPTION OF THE PREFERRED EMBODIMENT

Figure 1:
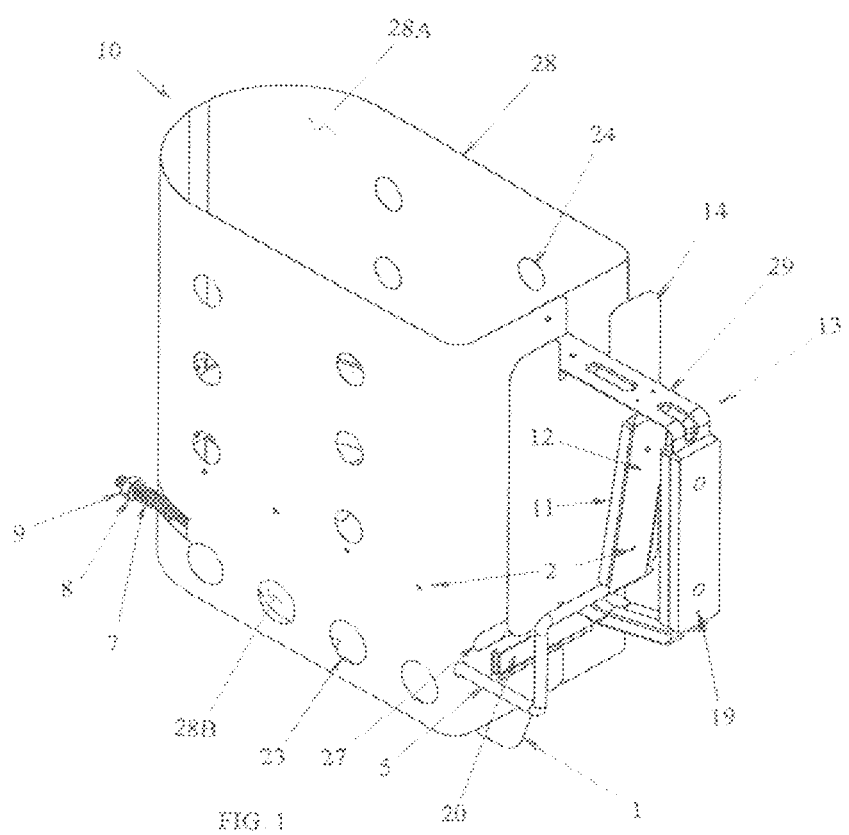
FIG. 1 is an isometric view of the invention without the electric heating element, from a top perspective.

Referring to FIG. 1 which is an isometric view of the preferred embodiment charcoal starter 10 with the single piece hinged grate 1 in the open position exhibiting the following features: housing 28 having an upper chamber 28A and a lower chamber 28B; a single piece hinged grate 1; a heat shield 14; a main handle assembly 13, which consists of: the main handle 29; plastic insulators for the main handle 19; the release handle 12; plastic insulators for the release handle 11 and assembly rivets 2, release bar 5; return spring 7; spring retaining washer 8; spring retaining nut 9; electric heating element retaining strap 20; opening for the electric heating element 27; lower chamber ventilation holes 23; and upper chamber ventilation holes 24. When release lever 12 is pulled back toward the insulators for the main handle 29, the release bar 5 attached to release lever 12, is pulled back with it. When the release bar 5 is pulled backward the spring retaining washer 8, held in place by the spring retaining nut 9, forces the return spring 7 to come under compression as it is trapped between charcoal starter housing 28 and the return spring washer 8. As release bar 5 moves backward toward the plastic insulators 19 for the main handle 29, the two release bar latches 6 shown in FIG. 5 move pass the release mechanism notches in the grate 30 shown in FIG. 5 and the weight of the single piece grate 1 allows the single piece grate 1 to rotate about two hinges for the single piece grate 3 shown in FIG. 5, thus allowing the single piece grate 1 to rotate into its fully open position which allows the charcoals to exit out the bottom of the charcoal starter 10.

Figure 2:
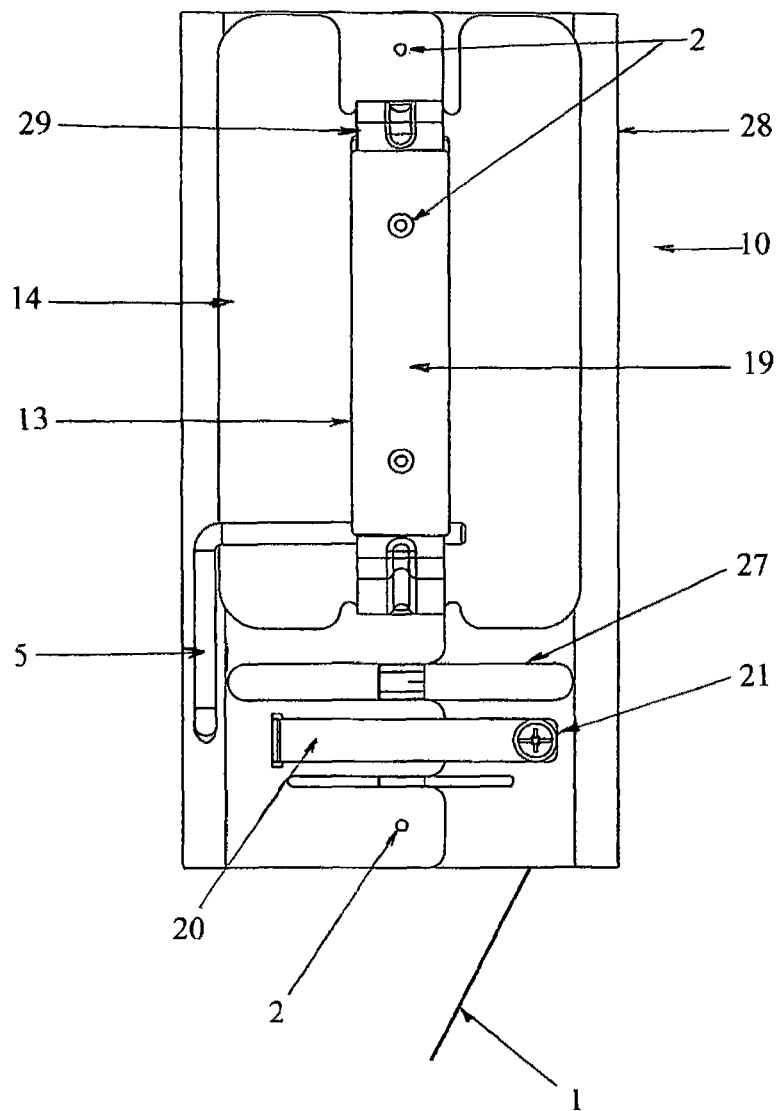
FIG. 2 is an end view of the invention from the handle end with the grate in the open position.

FIG. 2 is an end view of the preferred embodiment from the handle assembly 13 end of the charcoal starter 10 showing the one piece grate 1 in the open position having the exact features of FIG. 1. This view reveals the opening for the electric heating element 27 and the electric heating element strap 20 and the retaining strap screw 21. This also shows heat shield 14; plastic insulators for the main handle 19; main handle assembly 13; release bar 5; main handle 29; charcoal starter housing 28 and assembly rivets 2.

Figure 3:
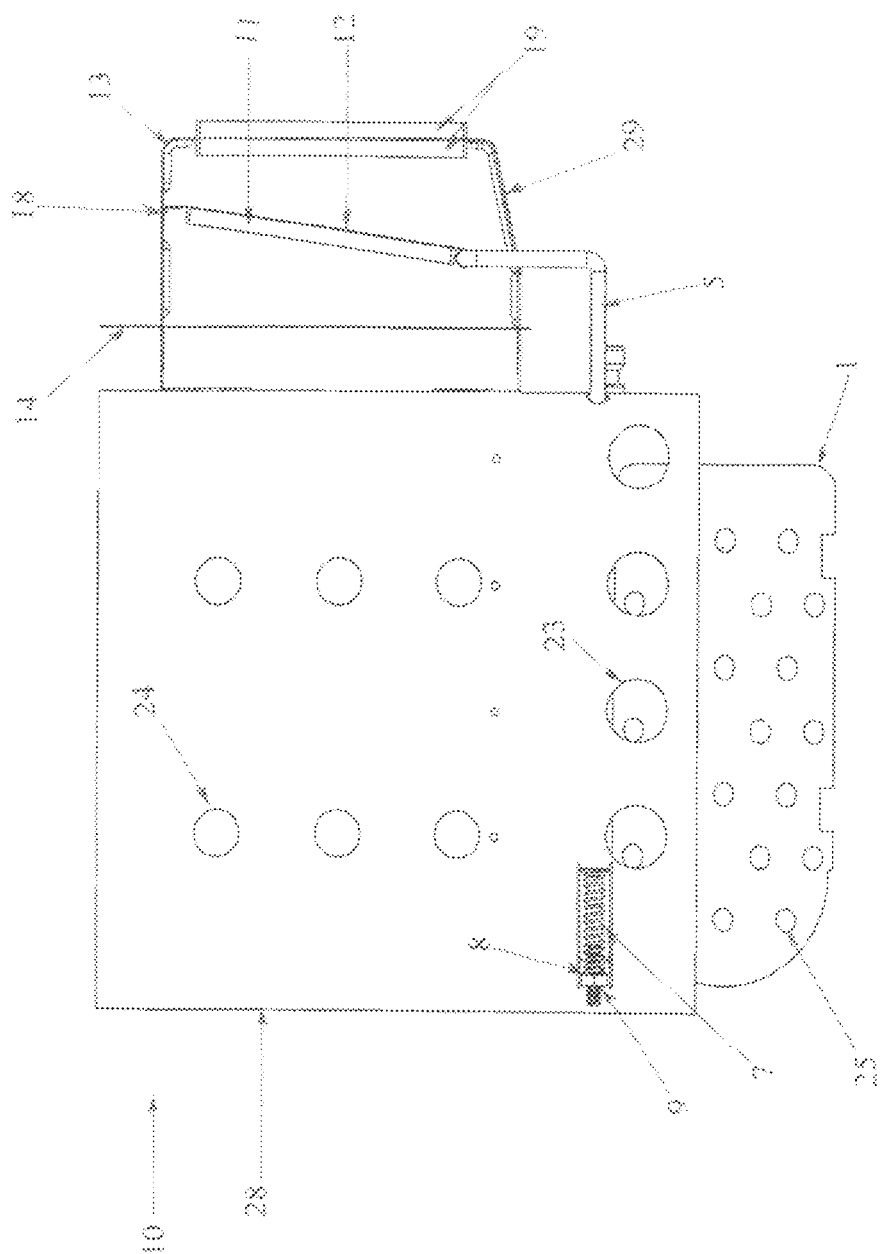
FIG. 3 is side view of the invention from the release mechanism side with the grate in the open position.

FIG. 3 is a side view of the preferred embodiment charcoal starter 10 showing the single piece hinged grate 1 in the open position having the exact features of FIG. 1. This view reveals the hinge for the release handle 18 and grate ventilation holes 25. Also shown in this view: heat shield 14; main handle assembly 13; main handle 29; plastic insulators 19; release handle 12; plastic insulator for release handle 11; release bar 5; charcoal starter housing 28; return spring 7; spring retaining washer 8; spring retaining nut 9; lower chamber ventilation holes 23; and upper chamber ventilation holes 24.

Figure 4:
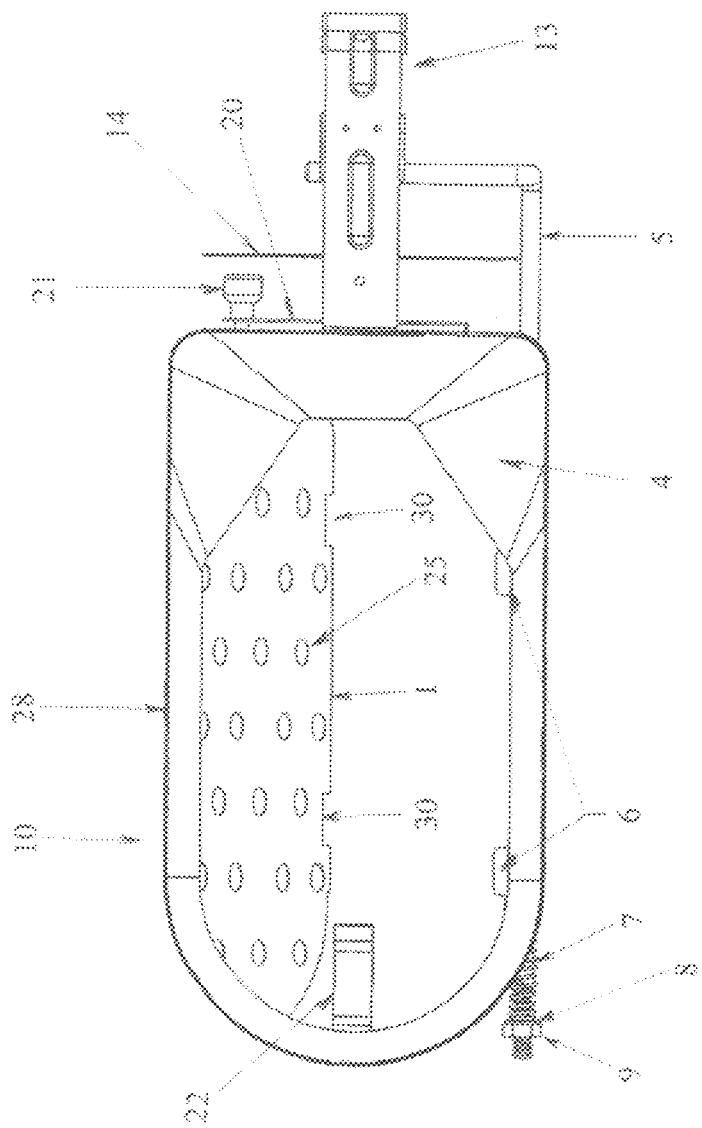
FIG. 4 is a top view of the invention with the grate in the open position.

FIG. 4 is a top view of the preferred embodiment charcoal starter 10 showing the single piece hinged grate 1 in the open position having the exact features of FIG. 1. This view reveals the charcoal chute 4, which is used to keep the charcoals from becoming lodged between the charcoal starter housing 28 and the element of the electric heating element 26 (shown in FIG. 9) by funneling the charcoal to the center of the charcoal starter 10. Also revealed in this view are the (2) two release bar latches 6 and the release mechanism notches in the grate 30. When the release bar latches 6 are moved into the openings provided by the release mechanism notches in the grate 30, the single piece hinged grate 1 is allowed to rotate into an open position which was the partition between the upper chamber 28A and lower chamber 28B (both shown in FIG. 1) this then provides a path for the incandescent charcoals to be safely deposited into the grill. This view also reveals the electric heating element clip 22, which is used to hold the tip of the element of the electric heating element 26 (shown in FIG. 9) and prevents it from rotating upward and possibly coming in contact with operator of the charcoal starter 10. Also shown in this view are: release bar 5; return spring 7; spring retaining washer 8; spring retaining nut 9; main handle assembly 13; heat shield 14; electric heating element retaining strap 20; strap retaining screw 21; and grate ventilation holes 25.

Figure 5:
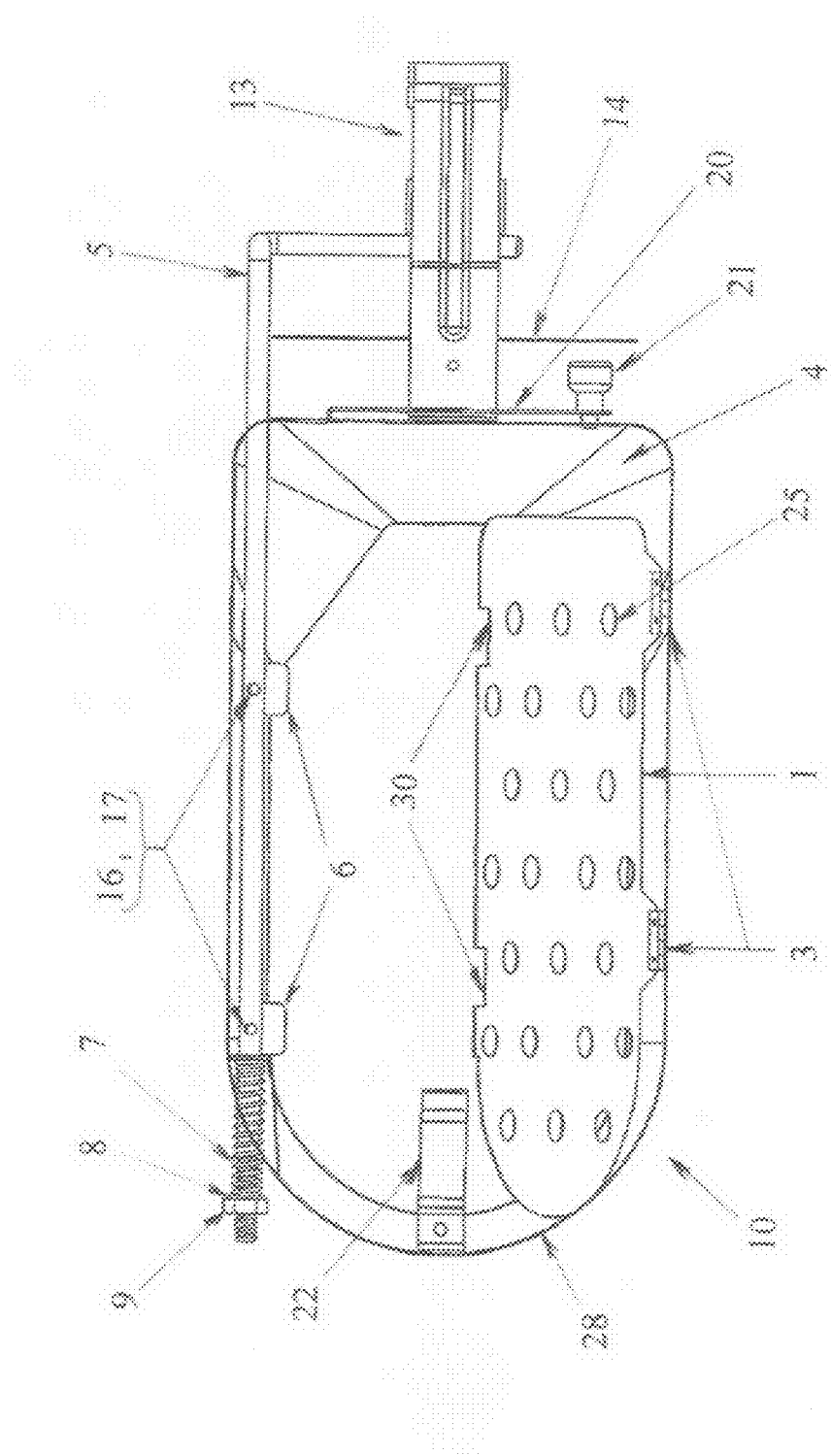
FIG. 5 is a bottom view of the invention with the grate in the open position.

FIG. 5 is a top view of the preferred embodiment charcoal starter 10 showing the single piece hinged grate 1 in the open position. This view reveals all of the elements described in FIG. 4 with the addition of the latch retaining nut 16 and the latch retaining screw 17. Both are used to attach the release bar latch 6 to the release bar 5. Also revealed are the hinges for the single piece grate 3. These are used to attach the single piece hinged grate 1 to the charcoal starter housing 28.

Figure 6:
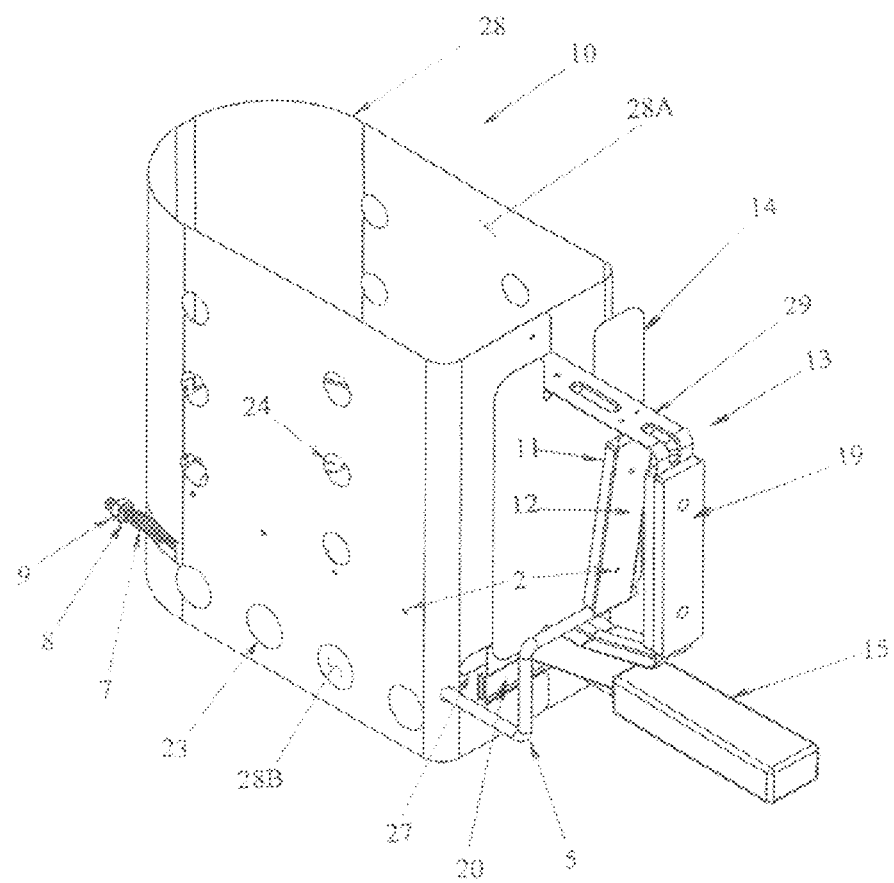
FIG. 6 is an isometric view of the invention with the electric heating element in place, from a top perspective.
Figure 10:
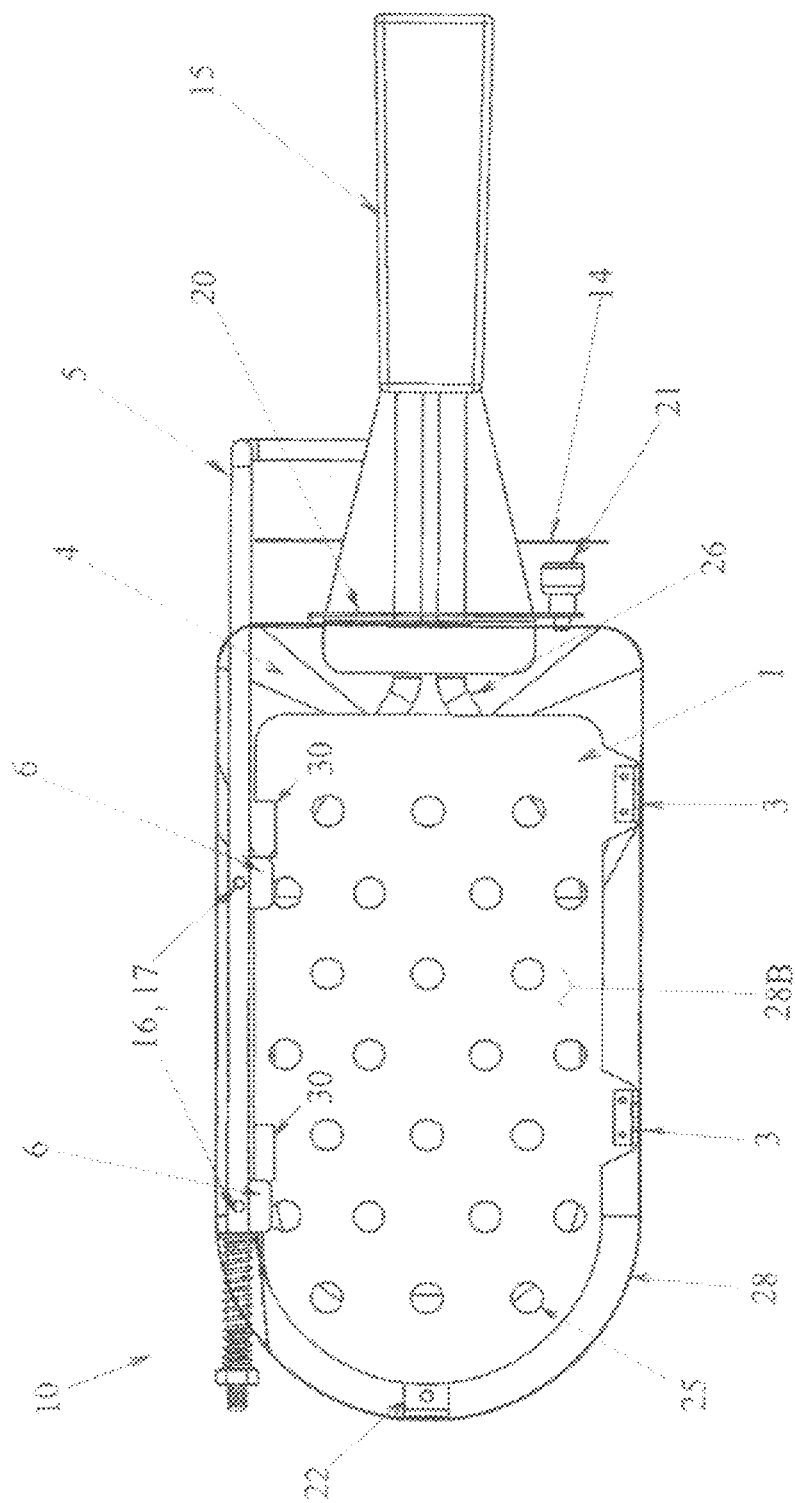
FIG. 10 is a bottom view of the invention with the electric heating element in place and the grate in the closed position.

Referring to FIG. 6 which is an isometric view of the preferred embodiment charcoal starter 10 with the single piece hinged grate 1 (shown in FIG. 1) in the closed position exhibiting the following features: housing 28 having an upper chamber 28A and a lower chamber 28B; a heat shield 14; a main handle assembly 13, which consists of: the main handle 29; plastic insulators for the main handle 19; the release handle 12; plastic insulators 11 for the release handle and assembly rivets 2, release bar 5; return spring 7; spring retaining washer 8; spring retaining nut 9; electric heating element retaining strap 20; opening for the electric heating element 27; electric heating element 15: lower chamber ventilation holes 23; and upper chamber ventilation holes 24. When release lever 12 is pulled back toward the insulators for the main handle 19, the release bar 5 attached to release lever 12, is pulled back with it. When the release bar 5 is pulled backward the spring retaining washer 8, held in place by the spring retaining nut 9, forces the return spring 7 to come under compression as it is trapped between charcoal starter housing 28 and the return spring washer 8. As release bar 5 moves backward toward the plastic insulators for the main handle 19, the two release bar latches 6 shown in FIG. 10 move pass the release mechanism notches in the grate 30 shown in FIG. 10 and the weight of the single piece grate 1 allows the single piece grate 1 to rotate about two hinges for the single piece grate 3 as shown in FIG. 10, thus allowing the single piece grate 1 to rotate into its fully open position which allows the charcoals to exit out the bottom of the charcoal starter 10.

Figure 7:
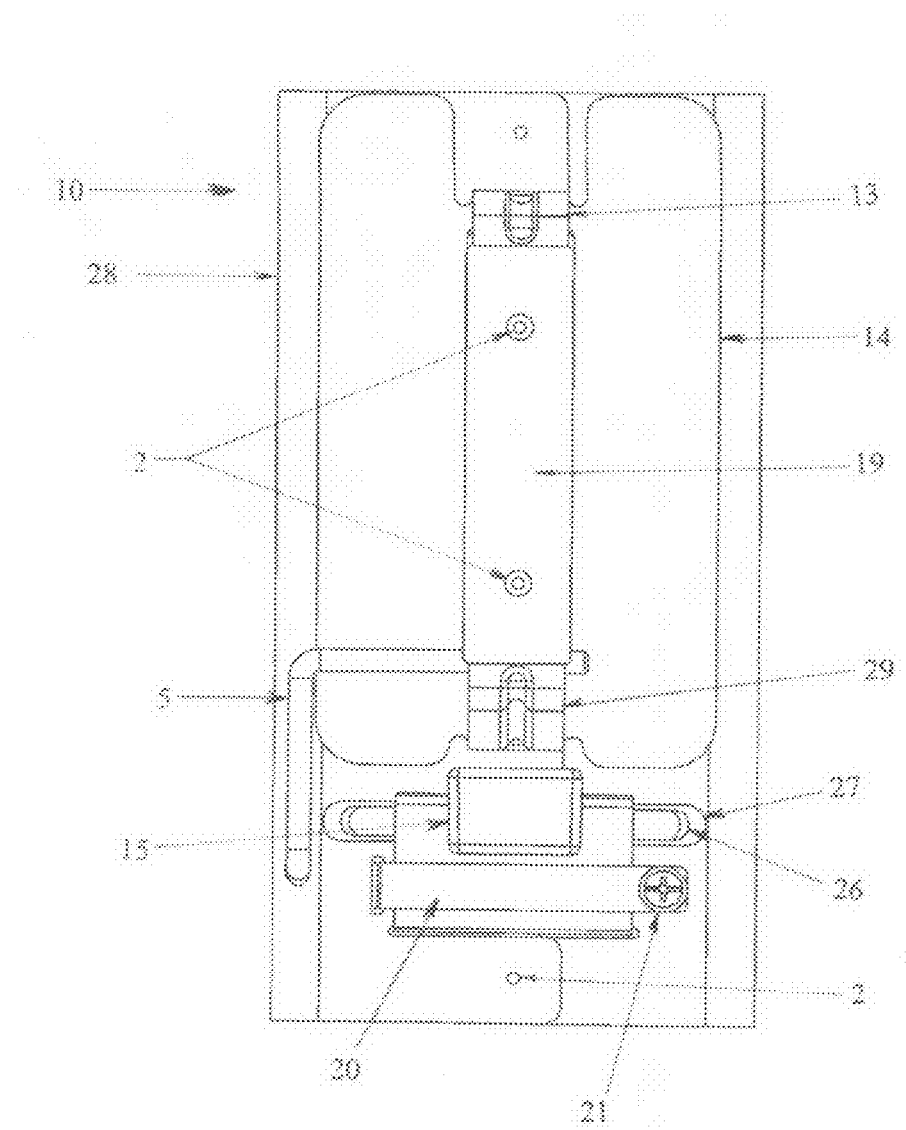
FIG. 7 is an end view of the invention from the handle end with the electric heating element in place and with the grate in the closed position.

FIG. 7 is an end view of the preferred embodiment from the handle assembly 13 end of the charcoal starter 10 showing the one piece grate 1 in the closed position having the exact features of FIG. 1. This view reveals the opening for the electric heating element 27 and the electric heating element strap 20 and the retaining strap screw 21 and the electric heating element 15 and the element of the electric heating element 26. This also shows heat shield 14; plastic insulators for the main handle 19; main handle assembly 13; release bar 5; main handle 29; charcoal starter housing 28 and assembly rivets 2.

Figure 8:
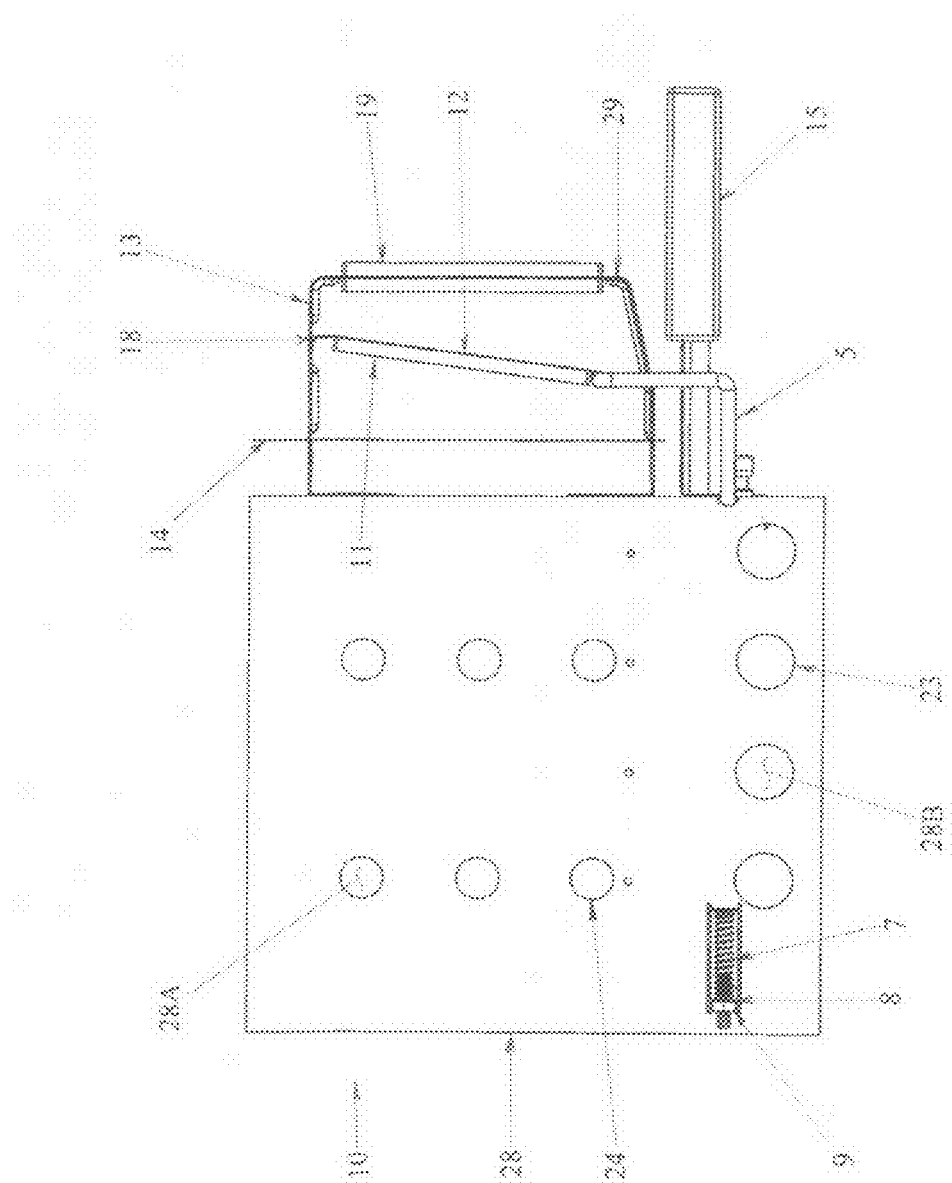
FIG. 8 is side view of the invention from the release mechanism side with the electric heating element in place and the grate in the closed position.

FIG. 8 is a side view of the preferred embodiment charcoal starter 10 showing the single piece hinged grate 1 in the closed position having the exact features of FIG. 1. This view reveals the hinge for the release handle 18 and grate ventilation holes 25. Also shown in this view: electric heating element 15, heat shield 14; main handle assembly 13; main handle 29; plastic insulators 19; release handle 12; plastic insulator for release handle 11; release bar 5; charcoal starter housing 28; return spring 7; spring retaining washer 8; spring retaining nut 9; lower chamber ventilation holes 23; and upper chamber ventilation holes 24.

Figure 9:
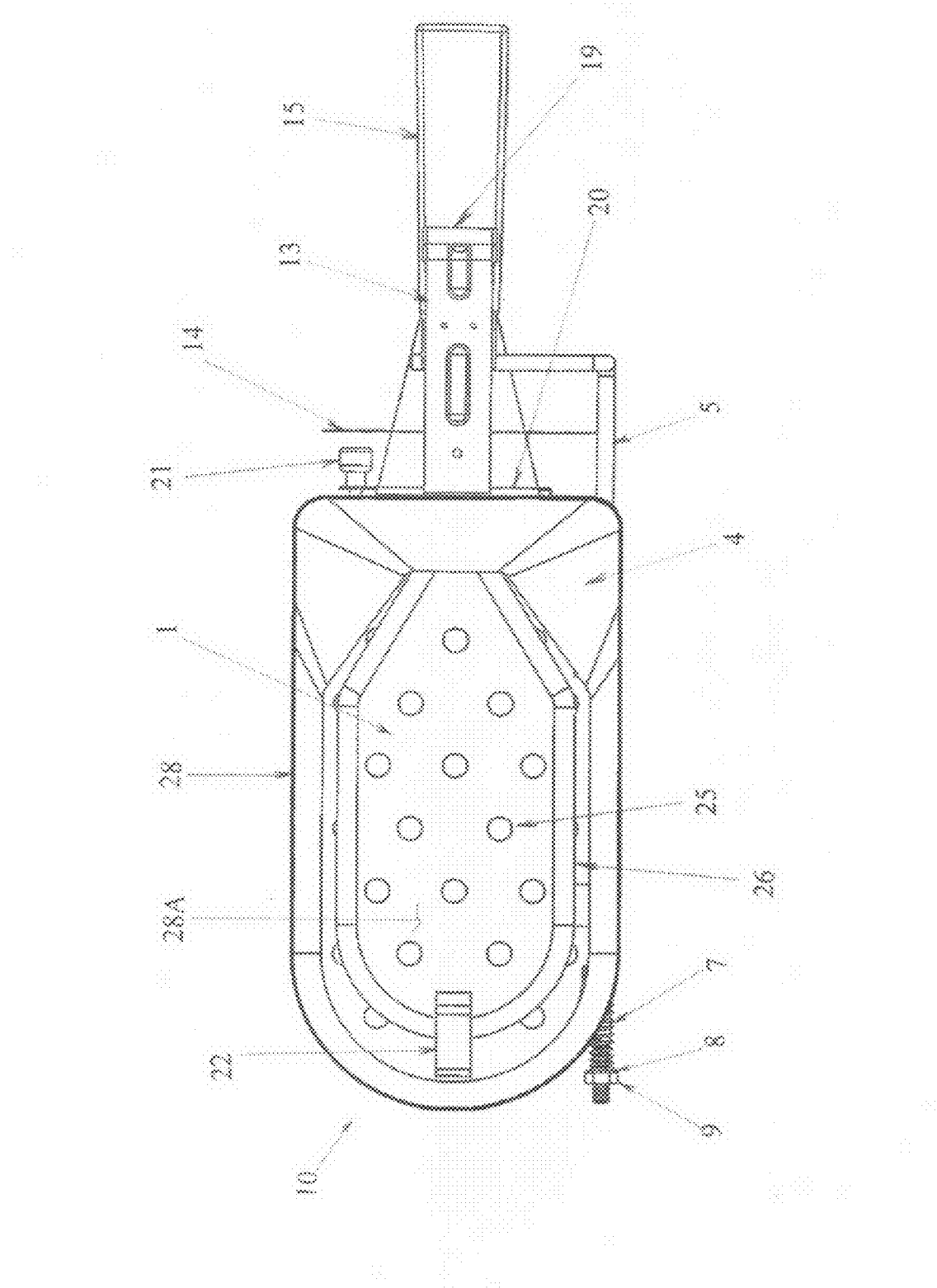
FIG. 9 is a top view of the invention with the electric heating element in place and the grate in the closed position.

FIG. 9 is a top view of the preferred embodiment charcoal starter 10 showing the single piece hinged grate 1 in the open position having the exact features of FIG. 1. This view reveals the charcoal chute 4, which is used to keep the charcoals from becoming lodged between the charcoal starter housing 28 and the element of the electric heating element 26 by funneling the charcoal to the center of the charcoal starter 10. Also revealed in this view are the electric heating element clip 22, which is used to hold the tip of the element of the electric heating element 26 and prevents it from rotating upward and possibly coming in contact with operator of the charcoal starter 10. Also shown in this view are: release bar 5; return spring 7; spring retaining washer 8; spring retaining nut 9; main handle assembly 13; heat shield 14; electric heating element retaining strap 20; strap retaining screw 21; and grate ventilation holes 25.

FIG. 10 is a bottom view of the preferred embodiment charcoal starter 10 showing the single piece hinged grate 1 in the closed position. This view reveals all of the elements described in FIG. 9 with the addition of the latch retaining nut 16 and the latch retaining screw 17. Both are used to attach the release bar latch 6 to the release bar 5. Also revealed in this view are the (2) two release bar latches 6 and the release mechanism notches in the grate 30. When the release bar latches 6 are moved into the openings provided by the release mechanism notches in the grate 30, the single piece hinged grate 1 is allowed to rotate into an open position which was the partition between the upper chamber 28A and lower chamber 28B (both shown in FIG. 6) this then provides a path for the incandescent charcoals to be safely deposited into the grill. Also revealed are the hinges for the single piece grate 3. These are used to attach the single piece hinged grate 1 to the charcoal starter housing 28.

What is claimed:

1. An improved charcoal starter comprising of a housing with vertical walls having a plurality of apertures and an opening at the top and the bottom, a main handle vertically affixed to the outside of said vertical walls, a single piece perforated grate horizontally positioned within said housing creating an upper chamber and a lower chamber, the improvement comprising of at least one hinge fixedly attached to said perforated grate and directly to the inside of said housing vertical wall, a release bar located beneath the perforated grate and opposite of said hinge, a thermally insulated release handle affixed to the release bar, where said release handle is positioned between the vertically affixed main handle and the charcoal starter housing.

2. The charcoal starter of claim 1 having a perforated grated with two coaxially aligned hinges.

3. The charcoal starter of claim 1 having a release handle where the top of the release handle having a hinged end where the hinged end is attached to the vertically affixed handle, a release bar attached to the bottom end of the release handle where the release bar protrudes through said vertical walls in two locations of said housing and opposite of said perforated grate hinges, the release bar also incorporating two protrusions with the perforated hinged grate having two notches on the opposite side of the perforated grate hinges.

4. An improved charcoal starter comprising of a housing with vertical walls having a plurality of apertures and an opening at the top and the bottom, a main handle vertically affixed to the outside of said vertical walls, a perforated grate horizontally positioned within said housing creating an upper chamber and a lower chamber, the improvement comprises of an opening in said housing vertical wall that allows for the insertion of an electric heating element where said opening is located above said perforated grate such that said electric heating element is in contact with the charcoal and has a clip fixedly attached to the inside of the housing above the perforated grate and opposite of the opening for the electric heating element.

5. The charcoal starter of claim 4 having a chute fixedly attached inside the charcoal starter housing and above the position of the electric heating element.

6. An improved charcoal starter comprising of a housing with vertical walls having a plurality of apertures and an opening at the top and the bottom, a main handle vertically affixed to the outside of said vertical walls, a perforated grate horizontally positioned within said housing creating an upper chamber and a lower chamber, the improvement comprising of at least one hinge fixedly attached to one side of said perforated grate and to the inside of said housing vertical wall, a release bar located beneath the perforated grate and opposite of said hinge, the release bar having at least one protrusion, and a thermally insulated release handle affixed to the release bar and an opening in said housing vertical wall that allows for the insertion of an electric heating element where said opening is located above said perforated grate such that said electric heating element is in contact with the charcoal.

7. The charcoal starter of claim 6 having a perforated grated with two coaxially aligned hinges.

8. The charcoal starter of claim 6 having a release handle positioned between the vertically affixed main handle and the charcoal starter housing with the release handle having a top and a bottom, the top of the release handle having a hinged end where the hinged end is attached to the vertically affixed main handle, a release bar attached to the bottom end of the release handle where the release bar protrudes through said vertical walls in two locations of said housing and opposite of said perforated grate hinges, the release bar also incorporating two protrusions with the perforated hinged grate having two notches on the opposite side of the perforated grate hinges.

9. The charcoal starter of claim 6 that has a clip fixedly attached to the inside of the housing above the perforated grate and opposite of the opening for the electric heating element.

10. The charcoal starter of claim 6 having a chute fixedly attached inside the charcoal starter housing and above the position of the electric heating element.

* * * * *